United States Patent
Shirolkar et al.

(10) Patent No.: US 12,450,225 B2
(45) Date of Patent: Oct. 21, 2025

(54) DYNAMICALLY LIMITING THE SCOPE OF SPREADSHEET RECALCULATIONS

(71) Applicant: Microsoft Technology Licensing, LLC, Redmond, WA (US)

(72) Inventors: Prashant Anand Shirolkar, Kirkland, WA (US); George Randell Dong, Sammamish, WA (US); Alexander Yuryevich Novokhodko, Redmond, WA (US); Jeffrey James Duzak, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 4 days.

(21) Appl. No.: 17/341,770

(22) Filed: Jun. 8, 2021

(65) Prior Publication Data
US 2022/0318232 A1    Oct. 6, 2022

Related U.S. Application Data

(60) Provisional application No. 63/169,046, filed on Mar. 31, 2021.

(51) Int. Cl.
*G06F 16/23*    (2019.01)
*G06F 40/166*   (2020.01)

(52) U.S. Cl.
CPC ........ *G06F 16/2379* (2019.01); *G06F 40/166* (2020.01)

(58) Field of Classification Search
CPC ... G06F 16/2379; G06F 40/166; G06F 40/194
USPC .......................................................... 707/703
See application file for complete search history.

(56) References Cited

U.S. PATENT DOCUMENTS

| | | | | |
|---|---|---|---|---|
| 5,604,854 | A * | 2/1997 | Glassey | G06F 40/18 715/788 |
| 5,926,822 | A * | 7/1999 | Garman | G06F 40/18 715/201 |
| 6,701,485 | B1 * | 3/2004 | Igra | G06F 40/18 715/209 |
| 7,673,227 | B2 * | 3/2010 | Kotler | G06F 40/103 715/209 |
| 7,747,657 | B2 * | 6/2010 | Singh | G06F 16/258 707/803 |
| 9,798,889 | B1 * | 10/2017 | Karpel | G06F 21/6227 |

(Continued)

OTHER PUBLICATIONS

Exceltip, "Change all the cells in the ActiveSheet to values using VBA in Microsoft Excel", Aug. 7, 2020, https://www.exceltip.com/cells-ranges-rows-and-columns-in-vba/change-all-the-cells-in-the-activesheet-to-values-using-vba-in-microsoft-excel.html, pp. 1-7 (Year: 2020).*

(Continued)

*Primary Examiner* — Sherief Badawi
*Assistant Examiner* — Jessica N Le

(57) ABSTRACT

In various implementations, a calculation manger identifies one or more external references within a workbook, wherein the workbook resides in a spreadsheet environment comprising multiple workbooks. The recalculation manager then identifies a scope of a recalculation, triggered by an event in the workbook, based on one or more factors comprising the one or more external references. A recalculation engine then performs the recalculation within the identified scope.

18 Claims, 5 Drawing Sheets

(56) References Cited

U.S. PATENT DOCUMENTS

| | | | |
|---|---|---|---|
| 10,025,471 B1* | 7/2018 | Teicher | G06F 3/0484 |
| 10,705,805 B1* | 7/2020 | Bosworth | G06F 40/186 |
| 10,740,550 B1* | 8/2020 | Bosworth | G06F 21/6209 |
| 11,170,165 B1* | 11/2021 | Smith Devine | G06F 21/6227 |
| 11,194,793 B1* | 12/2021 | Srivastava | G06F 16/2282 |
| 11,308,269 B1* | 4/2022 | Rodgers | G06F 40/18 |
| 11,714,796 B1* | 8/2023 | Srivastava | G06F 40/18 707/769 |
| 2002/0091730 A1 | 7/2002 | Bedford et al. | |
| 2003/0106040 A1* | 6/2003 | Rubin | G06F 40/18 717/106 |
| 2004/0103366 A1* | 5/2004 | Peyton-Jones | G06F 40/18 715/213 |
| 2005/0050088 A1* | 3/2005 | Kotler | G06F 40/18 707/999.102 |
| 2005/0097115 A1* | 5/2005 | Bedford | G06F 40/18 |
| 2006/0069993 A1* | 3/2006 | Jones | G06F 9/505 715/267 |
| 2006/0136534 A1* | 6/2006 | Boon | G06F 40/18 708/200 |
| 2006/0224946 A1* | 10/2006 | Barrett | G06F 40/18 715/209 |
| 2007/0050416 A1* | 3/2007 | Battagin | G06F 21/6254 |
| 2007/0055945 A1* | 3/2007 | Weber | G06F 40/18 715/255 |
| 2008/0028287 A1* | 1/2008 | Handsaker | G06F 40/18 707/999.006 |
| 2009/0089067 A1* | 4/2009 | Campbell | G06Q 10/10 705/344 |
| 2009/0182763 A1 | 7/2009 | Hawking | |
| 2013/0055058 A1* | 2/2013 | Leong | G06F 40/18 715/219 |
| 2015/0193405 A1* | 7/2015 | Gensburg | G06F 11/3692 715/229 |
| 2016/0018974 A1* | 1/2016 | Welton | G06Q 10/10 715/753 |
| 2016/0124932 A1* | 5/2016 | Chen | G06F 16/248 715/217 |
| 2017/0124142 A1* | 5/2017 | Becker | G06F 16/2379 |
| 2018/0157467 A1* | 6/2018 | Stachura | G06F 8/38 |
| 2019/0138587 A1* | 5/2019 | Silk | G06F 40/197 |
| 2020/0004799 A1* | 1/2020 | Gross | G06F 17/11 |
| 2020/0349561 A1* | 11/2020 | Kuchkovsky Jimenez | G06F 16/2379 |
| 2022/0067271 A1* | 3/2022 | Logan | H04L 67/1097 |

OTHER PUBLICATIONS

Brandl, et al., "Workbook Object (Excel)", Retrieved From https://docs.microsoft.com/en-us/office/vba/api/excel.workbook, May 15, 2019, 9 Pages.

Brandl, et al., "Worksheet. Calculate Method (Excel)", Retrieved From https://docs.microsoft.com/en-us/office/vba/api/excel.worksheet.calculate(method), May 30, 2019, 2 Pages.

Romero, et al., "Programming for the Single Document Interface in Excel", Retrieved From : https://docs.microsoft.com/en-us/office/vba/excel/concepts/programming-for-the-single-document-interface-in-excel, Jun. 8, 2017, 15 Pages.

Smith, et al., "Excel Recalculation", Retrieved From : https://docs.microsoft.com/en-us/office/client-developer/excel/excel-recalculation#volatile-and-non-volatile-functions, Aug. 22, 2018, 10 Pages.

"International Search Report and Written Opinion Issued in PCT Application No. PCT/US22/020280", Mailed Date: Jun. 27, 2022, 10 Pages.

* cited by examiner

DYNAMICALLY LIMITING THE SCOPE OF SPREADSHEET RECALCULATIONS

RELATED APPLICATIONS

This application claims priority to U.S. Provisional Patent Application No. 63/169,046, entitled DYNAMICALLY LIMITING THE SCOPE OF SPREADSHEET RECALCULATIONS, and filed on Mar. 31, 2021, which is hereby incorporated by reference in its entirety.

TECHNICAL FIELD

Aspects of the disclosure are related to the field of software applications and services and, more particularly, to recalculation operations in spreadsheet environments.

BACKGROUND

Recalculations in spreadsheet applications are generally performed on a global basis, meaning that each time a recalculation is triggered, the scope of the recalculation encompasses all of the open workbooks in an a given environment. A calculation manager in a spreadsheet application tracks which cells in a given workbook are not up to date ("dirty") so that when the recalculation runs, those cells are included in the recalculation. Volatile formulas are a type of formula that are always out of date, such as the NOW function, the RAND function, and others. The presence of these functions in workbooks can slow the user experience and is especially bothersome if they reside in workbooks that are not active.

For example, a user working in an active workbook may enter a value in a cell that is referenced not only by formulas in the active workbook, but by formulas in other workbooks that are open on the computer, but not active. Changing the value in the cell serves as a trigger for the calculation engine to recalculate any cells that are out of date, which include the cells that depend on the cell that triggered the recalculation. The recalculation operation will thus bring those cells up to date, but the recalculation will also operate on other dirty cells that are not dependent on the triggering cell. In fact, recalculating those cells can trigger yet more recalculations in a spiral that can degrade the user experience and waste processing resources, especially when the impacted cells are out of view of the user in inactive workbooks.

OVERVIEW

Technology is disclosed herein for improving the user experience in spreadsheet applications by dynamically limiting the scope of recalculations. In various implementations, a calculation manger identifies one or more external references within a workbook, wherein the workbook resides in a spreadsheet environment comprising multiple workbooks. The recalculation manager then identifies a scope of a recalculation, triggered by an event in the workbook, based on one or more factors comprising the one or more external references. A recalculation engine then performs the recalculation within the identified scope.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Technology is disclosed herein for enhancing dynamically scoping recalculation operations in spreadsheet environments. In an implementation, a computing device having a spreadsheet application running therein executes a calculation management process. The process may be an integrated component of the application or may be external to the application.

The process is embodied in program instructions that, when executed by one or more processors in the computing device, direct the device to identify one or more external references within a workbook, wherein the workbook resides in a spreadsheet environment comprising multiple workbooks. The computing device then identifies a scope of a recalculation, triggered by an event in the workbook, based on one or more factors comprising the one or more external references. The device also performs the recalculation within the identified scope.

In some implementations as those described above, each external reference of the one or more external references links the workbook to one other workbook of the multiple workbooks, and the identified scope limits the recalculation to the workbook and the one other workbook.

In the same or other implementations as those described above, the identified scope excludes from the recalculation any other workbooks of the multiple workbooks that are not linked by the external references to the workbook, even if any of the other workbooks include volatile functions.

In the same or other implementations as those described above, the one or more factors further comprise a view port and wherein the identified scope further limits the recalculation to a portion of the workbook in range of the viewport and any portions of the one other workbook linked to the portion of the workbook.

In the same or other implementations as those described above, each external reference of the one or more external references links a worksheet in the workbook to one other worksheet in the one other workbook.

In the same or other implementations as those described above, the identified scope limits the recalculation to the workbook and the one other worksheet.

In the same or other implementations as those described above, the identified scope limits the recalculation to the worksheet and the one other worksheet.

In the same or other implementations as those described above, the one or more factors further comprise a view port and wherein the identified scope further limits the recalculation to a portion of the worksheet in range of the viewport and any portions of the one other worksheet linked to the portion of the worksheet.

In the same or other implementations as those described above, the one or more factors further comprises a status of each of the multiple workbooks with respect to real-time data.

Figure 1:
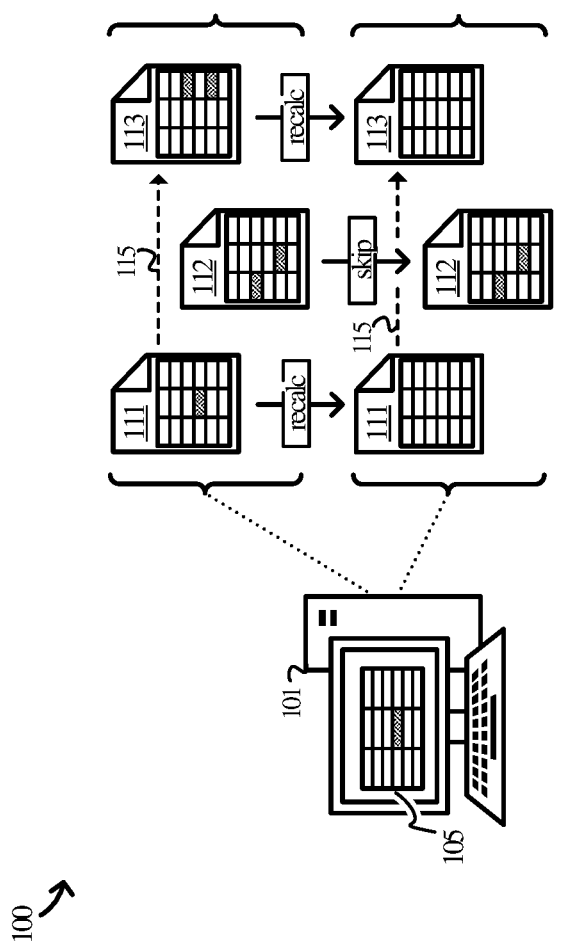
FIG. 1 illustrates an operational environment in an implementation.
Figure 5:
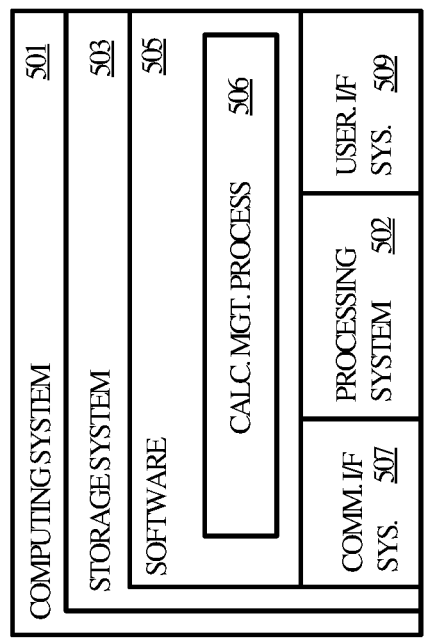
FIG. 5 illustrates a computing device suitable for implementing the various operational environments, architectures, processes, scenarios, and sequences discussed below with respect to the Figures.

Referring now to the drawings, FIG. 1 illustrates an operational environment 100 in an implementation. Operational environment 100 includes computing device 101 that hosts a spreadsheet application that, when executed, creates a spreadsheet environment comprising multiple spreadsheet workbooks. Examples of computing devices 101 include personal computers, tablet computers, mobile phones, and any other suitable devices, of which computing device 501 in FIG. 5 is broadly representative.

Workbook 111, workbook 112, and workbook 113 are representative of the workbooks within a spreadsheet environment. A user interface 105 displayed by computing device 101 includes a representation of an active one of the workbooks which, for exemplary purposes, is assumed to be workbook 111.

The workbooks in the environment may include external references to each other. For instance, a worksheet within one workbook may include one or more cells having formulas that refer to other cells in other sheets of the other workbooks. As an example, workbook 111 includes an external reference 115 to workbook 113. This means that a formula in workbook 111 refers to a cell value in workbook 113 such that, for the value in workbook 111 to be up to date, the cell value in workbook 113 must also be up to date.

As discussed above, recalculations in spreadsheet applications are generally performed on a global basis, meaning that each time a recalculation is triggered, the scope of the recalculation encompasses all of the open workbooks in an a given environment. A calculation manager tracks which cells in a given workbook are not up to date ("dirty") so that when the recalculation runs, those cells are included in the recalculation. Volatile formulas are a type of formula that are always out of date, such as the NOW function, the RAND function, and others. The presence of these functions in workbooks can slow the user experience and is especially bothersome if they reside in workbooks that are not active.

Figure 2:
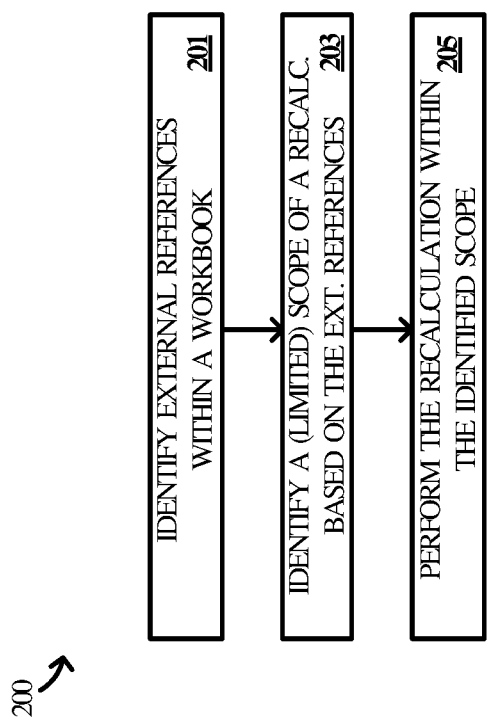
FIG. 2 illustrates a calculation management process in an implementation.

In an advance, calculation management process 200 in FIG. 2 dynamically limits the scope of a recalculation operation. Calculation management process 200 is employed by a computing device to manage recalculation operations in a spreadsheet environment. Calculation management process 200 may be implemented in program instructions in the context of any of the software applications, modules, components, or other such programming elements of computing device 101. The program instructions direct its underlying physical or virtual computing system or systems to operate as follows, referring parenthetically to the steps in FIG. 2 in the context of operational environment 100 for exemplary purposes.

In operation, computing device 101 identifies the external references of a workbook (step 201). The references may be tracked in a table, graph, or other such data structure. The data structure may be specific to the workbook, specific to a worksheet within the workbook, or global with respect to any or all workbooks and worksheets in the environment.

When a recalculation is triggered in the workbook, computing device 203 examines the data structure(s) to identify a limited scope of the recalculation (step 203). The scope is determined based on one or more factors such as the external references and, more particularly, the other workbooks and/or sheets identified by the external references. Having determined the scope, computing device 101 then performs the recalculation within the limits of the identified scope (step 205).

As an example, workbook 111 includes an external reference 115 to workbook 113, whereas it has no references to workbook 112. The darkened cells in each workbook represent cells that are out of date and thus would normally be included in the recalculation. When a recalculation is triggered by an event in workbook 111, the scope of the recalculation is determined to include workbook 111 and workbook 113. However, workbook 112 is excluded from the recalculation even though it has out of date cells.

Figure 3:
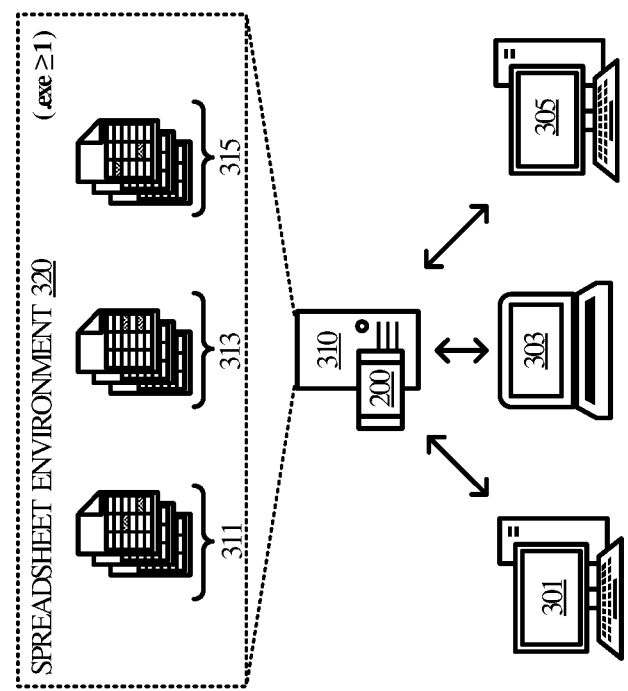
FIG. 3 illustrates another operational environment in an implementation.

FIG. 3 illustrates another operational environment 300 in an implementation. Operational environment 300 includes computing device 301, 303, and 305. Computing device 301, 303, and 305 access a spreadsheet service provided by server 310. Service 310 is representative of one or more physical and/or virtual servers in a cloud environment capable of hosting a spreadsheet application. As such, server 310 generates a spreadsheet environment 320 when executing one or more spreadsheet application processes to provide the service to computing devices 301, 303, and 305.

Server 310 also includes calculation management process 200 which may be embodied in the program instructions of the one or more spreadsheet applications resident on server 310. Each instance of the application may execute its own instance of calculation management process 200. Likewise, spreadsheet environment 320 may include one or more calculation engines that function to calculate the values for the formulas in workbook sets 311, 313, and 315.

Workbook set 311 represents multiple workbooks associated with computing device 301 and/or a user account associated with computing device 301. Workbook set 313 represents multiple workbooks associated with computing device 303 and/or a user account associated with computing device 303. Similarly, workbook set 315 represents multiple workbooks associated with computing device 305 and/or a user account associated with computing device 305.

In operation, server 310 employs calculation management process 200 on a per-set basis. That is, calculation management process 200 keeps the different workbook sets separate from each other. The external references of each workbook in each set are tracked such that they may be considered when a recalculation is triggered by an event in an active workbook. When a local event in one of the computing devices triggers a recalculation (e.g., when a user enters a new value into a cell of an active workbook on computing device 301), server 310 identifies the external references of the active workbook to identify a limited scope of the recalculation. The scope is determined based on one or more factors such as the external references and, more particularly, the other workbooks and/or sheets identified by the external references. Server 310 then performs the recalculation within the limits of the identified scope.

Figure 4:
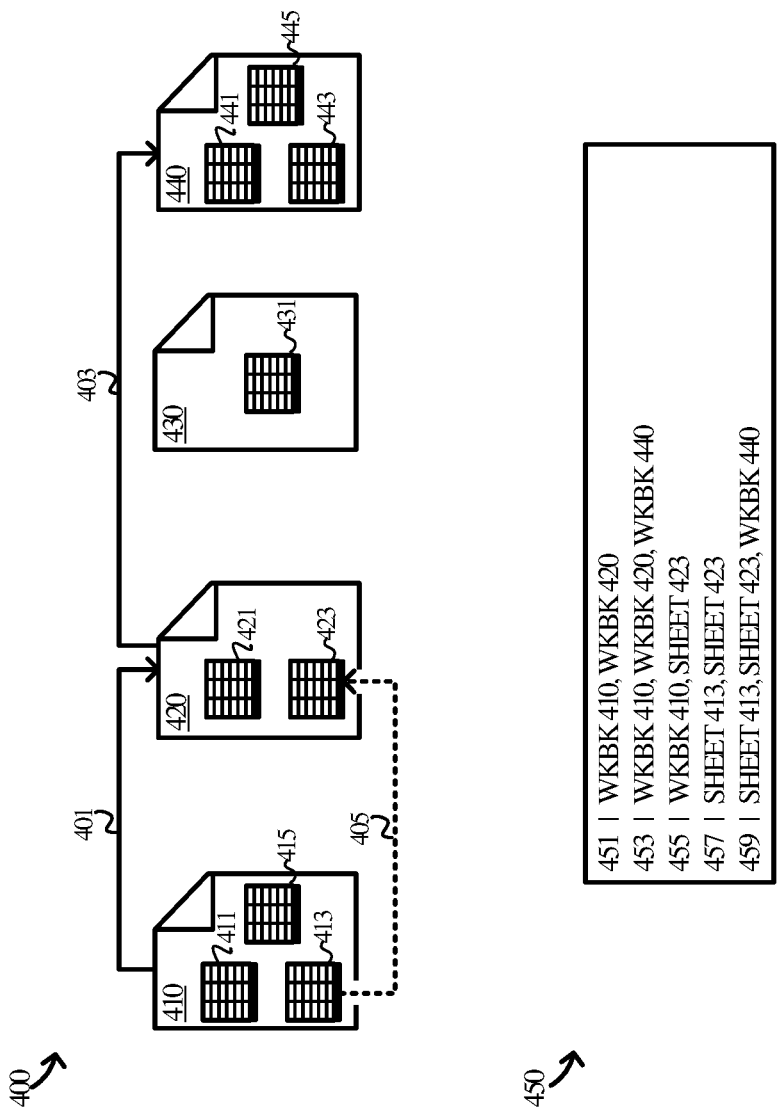
FIG. 4 illustrates an operational scenario in an implementation.

FIG. 4 illustrates an operational scenario 400 in an implementation, as well as example scopes 450 of possible recalculations. Operational scenario 400 involves four workbooks represented by workbook 410, workbook 420, workbook 430, and workbook 440. Workbook 410 includes worksheets 411, 413, and 415. Workbook 420 includes worksheets 421 and 423. Workbook 430 includes worksheet 431. Finally, workbook 440 includes worksheet 441, worksheet 445, and worksheet 443.

External references between the workbooks may be tracked in various ways. For instance, a table within workbook 410 may identify at a workbook level its external references to other workbooks such external reference 401 to workbook 420. Alternatively—or in addition—workbook 410 may also track external references on a per-sheet basis such as external reference 405 between worksheet 413 and worksheet 423. Similarly, workbook 420 may track its external references at a workbook level (e.g., external references 401 and 403). References between worksheets in the same workbook can also be tracked in the same or similar tables.

At runtime, when a recalculation is triggered in workbook 410, a calculation management process as disclosed herein identifies a limited scope of the recalculation. The scope may be determined on a per-workbook basis, a per-worksheet basis, or a combination of the two, depending upon the granularity with which external references are tracked in the workbooks. The calculation management process may also consider chains of external references that may extend one or two levels beyond an initial link.

Here, five exemplary recalculation limits are disclosed. In a first example, scope 451 is limited to workbook 410 and workbook 420 as it was determined on a per-workbook basis and only one level deep. Scope 453 is limited to workbook 410, workbook 420, and workbook 440 as it was determined on a per-workbook basis but more than one level deep. Scope 455 is limited to workbook 410 and worksheet 423 as it was a determined on a combined basis of workbooks and worksheets. Scope 457 is limited to worksheet 413 and worksheet 423 as it was determined on a per-worksheet basis. Finally, scope 459 is limited to worksheet 413, worksheet 423, and worksheet 440 as it was determined on a combined basis and with respect to multiple levels of linking. It may be appreciated that other limits to the scope of a recalculation are possible such as limiting the scope to a subset of worksheets in the same workbook.

FIG. 5 illustrates computing device 501 that is representative of any system or collection of systems in which the various processes, programs, services, and scenarios disclosed herein may be implemented. Examples of computing device 501 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 501 may be implemented as a single apparatus, system, or device or may be implemented in a distributed manner as multiple apparatuses, systems, or devices. Computing device 501 includes, but is not limited to, processing system 502, storage system 503, software 505, communication interface system 507, and user interface system 509 (optional). Processing system 502 is operatively coupled with storage system 503, communication interface system 507, and user interface system 509.

Processing system 502 loads and executes software 505 from storage system 503. Software 505 includes and implements calculation management process 506, which is representative of the calculation management processes discussed with respect to the preceding Figures. When executed by processing system 502, software 505 directs processing system 502 to operate as described herein for at least the various processes, operational scenarios, and sequences discussed in the foregoing implementations. Computing device 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, graphical processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 (including calculation management process 506) may be implemented in program instructions and among other functions may, when executed by processing system 502, direct processing system 502 to operate as described with respect to the various operational scenarios, sequences, and processes illustrated herein. For example, software 505 may include program instructions for implementing a calculation management process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing device 501 is representative) overall from a general-purpose computing system into a special-purpose computing system customized to perform calculation management in an optimized manner. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing device comprising:
   one or more processors;
   one or more computer readable storage media operatively coupled with the one or more processors; and
   program instructions stored on the one or more computer readable storage media that, when executed by the one or more processors, direct the computing device to at least:
   maintain a data structure that tracks external references, at a workbook level and a worksheet level, between multiple open workbooks in a spreadsheet environment;
   determine a scope of a recalculation in the spreadsheet environment on at least one of a per-workbook basis and a per-worksheet basis, and at a granularity with which external references are tracked in the data structure, based on cells in the multiple open workbooks that are out of date, wherein the multiple open workbooks include an active workbook, a first inactive workbook, and a second inactive workbook, and wherein the second inactive workbook includes a first cell that is out of date;
   identify, based on the data structure, an external reference within the active workbook, wherein the external reference comprises a reference to a second cell in the first inactive workbook;
   limit the scope of the recalculation to only the active workbook and the first inactive workbook based at least on the external reference, resulting in a limited scope, wherein the recalculation is triggered by an event in the active workbook and excludes the second inactive workbook that includes the first cell that is out of date;
   perform the recalculation within the limited scope by recalculating one or more cells in the active workbook and one or more cells in the first inactive workbook referenced in the data structure and not recalculating any cells in the excluded second inactive workbook; and
   update content of one or more cells included in the recalculation.

2. The computing device of claim 1 wherein the limited scope further limits the recalculation to a portion of the active workbook in range of a viewport and any portions of the first inactive workbook referenced in the active workbook.

3. The computing device of claim 1 wherein the external reference links a worksheet in the active workbook to one other worksheet in the first inactive workbook.

4. The computing device of claim 3 wherein the limited scope limits the recalculation to the worksheet and the one other worksheet in the first inactive workbook.

5. The computing device of claim 3 wherein the limited scope further limits the recalculation to a portion of the worksheet in range of a viewport and any portions of the one other worksheet in the first inactive workbook linked to the portion of the worksheet.

6. The computing device of claim 1 wherein the first cell that is out of date in the excluded second inactive workbook includes a volatile function.

7. The computing device of claim 1 wherein to limit the scope of the recalculation, the program instructions direct the computing device to limit the scope based on one or more factors comprising a status of each of the multiple open workbooks with respect to real-time data.

8. A method for dynamically scoping recalculations in a spreadsheet environment, the method comprising:
maintaining a data structure that tracks external references, at a workbook level and a worksheet level, between multiple open workbooks in the spreadsheet environment;
determining a scope of a recalculation in the spreadsheet environment on at least one of a per-workbook basis and a per-worksheet basis, and at a granularity with which external references are tracked in the data structure, based on cells in the multiple open workbooks that are out of date, wherein the multiple open workbooks include an active workbook, a first inactive workbook, and a second inactive workbook, and wherein the second inactive workbook includes a first cell that is out of date;
identifying, based on the data structure, an external reference within the active workbook, wherein the external reference comprises a reference to a second cell in the first inactive workbook;
limiting the scope of the recalculation to only the active workbook and the first inactive workbook based at least on the external reference, resulting in a limited scope, wherein the recalculation is triggered by an event in the active workbook and excludes the second inactive workbook that includes the first cell that is out of date;
performing the recalculation within the limited scope by recalculating one or more cells in the active workbook and one or more cells in the first inactive workbook referenced in the data structure and not recalculating any cells in the excluded second inactive workbook; and
updating content of one or more cells included in the recalculation.

9. The method of claim 8 wherein the limited scope further limits the recalculation to a portion of the active workbook in range of a viewport and any portions of the first inactive workbook referenced in the active workbook.

10. The method of claim 8 wherein the one external reference links a worksheet in the active workbook to one other worksheet in the first inactive workbook.

11. The method of claim 10 wherein the limited scope limits the recalculation to the worksheet and the one other worksheet in the first inactive workbook.

12. The method of claim 10 wherein the limited scope further limits the recalculation to a portion of the worksheet in range of a viewport and any portions of the one other worksheet in the first inactive workbook liked to the portion of the worksheet.

13. The method of claim 8 wherein the first cell that is out of date in the excluded second inactive workbook includes a volatile function.

14. One or more computer readable storage media having program instructions stored thereon that, when executed by one or more processors, direct a computing device to at least:
maintain a data structure that tracks external references, at a workbook level and a worksheet level, between multiple open workbooks in a spreadsheet environment;
determine a scope of a recalculation in the spreadsheet environment on at least one of a per-workbook basis and a per-worksheet basis, and at a granularity with which external references are tracked in the data structure, based on cells in multiple open workbooks that are out of date, wherein the multiple open workbooks include an active workbook, a first inactive workbook, and a second inactive workbook, and wherein the second inactive workbook includes a first cell that is out of date;
identify, based on the data structure, an external reference within the active workbook, wherein the external reference comprises a reference to a second cell in the first inactive workbook;
limit the scope of the recalculation to only the active workbook and the first inactive workbook based at least on the external reference, resulting in a limited scope, wherein the recalculation is triggered by an event in the active workbook and excludes the second inactive workbook and includes the first cell that is out of date;
perform the recalculation within the limited scope by recalculating one or more cells in the active workbook and one or more cells in the first inactive workbook referenced in the data structure and not recalculating any cells in the excluded second inactive workbook; and
update content of one or more cells included in the recalculation.

15. The one or more computer readable storage media of claim 14, wherein the limited scope excludes from the recalculation any other workbooks of the multiple open workbooks that are not linked by other external references to the active workbook, even if any of the other workbooks include one or more out of date cells comprising volatile functions.

16. The one or more computer readable storage media of claim 14, wherein the limited scope further limits the recalculation to a portion of the active workbook in range of a viewport and any portions of the first inactive workbook referenced in the active workbook.

17. The one or more computer readable storage media of claim 14 wherein the external reference links a worksheet in the active workbook to one other worksheet in the first inactive workbook.

18. The one or more computer readable storage media of claim 17 wherein the limited scope includes the active workbook and the one other worksheet.

* * * * *